United States Patent [19]

Kramer et al.

[11] Patent Number: 5,481,384
[45] Date of Patent: Jan. 2, 1996

[54] DEFLECTOR SYSTEM WHICH PRODUCES DUAL, OPPOSITELY DIRECTED SCANNING BEAMS SIMULTANEOUSLY OR SUCCESSIVELY

[75] Inventors: Charles J. Kramer, Webster; Geoffrey B. Gretton, Honeoye Falls, both of N.Y.

[73] Assignee: Holotek Ltd., Rochester, N.Y.

[21] Appl. No.: 265,350

[22] Filed: Jun. 24, 1994

Related U.S. Application Data

[63] Continuation-in-part of Ser. No. 860,532, Mar. 30, 1992, Pat. No. 5,223,956.

[51] Int. Cl.$^6$ ............................. G02B 5/18; G02B 5/30; G02B 26/10; G02B 27/28
[52] U.S. Cl. ..................... 359/17; 359/211; 359/495; 359/566
[58] Field of Search ................. 359/17, 18, 209, 359/211, 246, 494, 495, 496, 566, 569

[56] References Cited

U.S. PATENT DOCUMENTS

| | | | |
|---|---|---|---|
| 3,272,988 | 9/1966 | Bloom et al. | 359/497 |
| 4,852,956 | 8/1989 | Kramer . | |
| 5,009,472 | 4/1991 | Morimoto | 359/495 |
| 5,046,794 | 9/1991 | Ritter . | |
| 5,097,351 | 3/1992 | Kramer . | |
| 5,114,217 | 5/1992 | Beiser . | |
| 5,179,463 | 1/1993 | Kramer . | |
| 5,183,350 | 2/1993 | Kramer . | |
| 5,223,956 | 6/1993 | Kramer . | |

FOREIGN PATENT DOCUMENTS 2-226111  9/1990  Japan ........................................ 359/212

OTHER PUBLICATIONS

Optical Scanning, G. F. Marshall, Editor Chapt 5 by C. J. Kramer (1991).
C. J. Kramer, IS&T SPIE Proc. on Color Hard Copy—II, vol. 1912, 388, Feb. 1993.
G. F. Marshall, SPIE Proc on Bean Defl. vol. 1454, 37, Mar. 1991.
G. F. Marshall, Laser Focus World, vol. 27 169, May 1991 "Optical Feedback Overcomes Scan–Line Wobble in Laser Typesetting".

*Primary Examiner*—Martin Lerner
*Attorney, Agent, or Firm*—M. LuKacher

[57] ABSTRACT

Centered monofacet deflector systems having a dipole laser beam scanning pattern (dual scanning beams which propagate in opposite directions) enables both the scan rate and the scan duty cycle of the scanning system to be doubled over deflectors which produce only one beam. The deflector may be a non-disc plane diffraction grating (NPDG) deflector or a dual reflecting cube (DRC) deflector having polarization sensitive beam splitting characteristics. The input beam polarization contains or is generated to contain orthogonally polarized components which are reflected or diffracted to produce one of the dual scanning beams and a transmitted beam through the element and retroreflected with the proper polarization to be deflected at the element to produce the other scanning beam thereby providing the capability of two simultaneous or sequential scan lines for every revolution of the deflector element. The deflector systems are useful for imaging applications, especially on recording media mounted on the internal surface of a drum.

19 Claims, 7 Drawing Sheets

DEFLECTOR SYSTEM WHICH PRODUCES DUAL, OPPOSITELY DIRECTED SCANNING BEAMS SIMULTANEOUSLY OR SUCCESSIVELY

This application is a continuation in part of U.S. patent application Ser. No. 860,532 filed Mar. 30, 1992 by Charles J. Kramer, et al., now U.S. Pat. No. 5,223,956 issued Jun. 29, 1993.

The present invention relates to beam deflecting systems, and particularly to systems for producing either simultaneously or at different times, including successively, a pair of laser beams for imaging applications.

The invention is especially suitable for use in providing a centered monofacet deflector system having a rotating deflector facet and an input beam which is centered on, or symmetric with respect to, the axis of rotation of the facet. The deflector system produces scanning beams as it rotates, which propagate in opposite directions thereby providing a dipole laser beam scanning pattern.

It is a feature of the invention to provide the scanning beams simultaneously or one at a time. When the beams are provided simultaneously, both the scanning rate and scanning duty cycle effectively doubles over a single beam deflector system. Doubling the duty cycle doubles the scan efficiency. Duty cycle and scan efficiency are described in detail in Chapter 5, Section 5.3.4, of the text, Optical Scanning, published by Marcel Dekker, Inc., New York, 1991, G. F. Marshall, Editor. Chapter 5 is authored by Charles J. Kramer and entitled "Holographic Deflector For Graphic Arts Systems".

This invention also provides improvements in the field of dual reflecting cube (DRC) deflectors in which an input beam undergoes dual reflections at reflecting surfaces and produces an output scanning beam essentially free of the effects of wobble of the deflector element as it rotates. The DRC deflector systems may operate with multi-wavelength light and have been called HoloColor® deflectors when sourced by Holotek, Ltd. of Rochester, N.Y., USA. Such deflector systems are the subject of U.S. patent application Ser. No. 835,160, filed Feb. 13, 1992, by Charles J. Kramer now U.S. Pat. No. 5,3,399, issued Nov. 22,1994.

This application is also an improvement over DRC deflector systems having polarization sensitive reflecting surfaces which are contained in a polarization beam splitter deflector element or a non-disc plane diffraction grating (NPDG) deflector element as described in the above-referenced U.S. Pat. 5,223,956. Both the Kramer application and the above-referenced patent describe monofacet beam deflector systems. The development and application of such systems is further described in an article by Charles J. Kramer entitled "Evolution of Monofacet Beam Deflectors For High Resolution Imaging applications," IS&T/SPIE Proceedings on Color Hard Copy and Graphic Arts II, Vol. 1912, p. 388, February, 1993.

It is a feature of this invention to provide dual beams using DRC reflectors either with polarization beam splitters including NPDG monofacets, which utilize one-half the total power of the input laser beam, when the dual beams are generated simultaneously, or the total power of the laser beam in each beam when generated successively or at different times.

Deflector systems have been suggested that generated two scans for each complete deflector rotation. See L. Beiser, U.S. Pat. No. 5,114,217, May 1992; J. A. Ritter, et al., U.S. Pat. No. 5,046,794, September 1991; and G. F. Marshall, "Butterfly Line Scanner" Rotary Twin Reflective Deflector That Desensitizes Scan-line Jitter To Wobble Of The Rotational Axis," SPIE Proceedings on Beam Deflection and Scanning Technologies, Vol. 1454, p. 37, March 1991; and G. F. Marshall, "Optical Feedback Overcome Scan-Line Wobble In Laser Type Setting," Laser Focus World, Vol. 27, p. 167, May 1991. In addition, centered non-disc dipole monograting deflector systems have been described in the C. J. Kramer, U.S. Pat. No. , 4,852,956, August 1989. The dipole deflector configurations disclosed by Beiser, Ritter and Marshall and further as shown and described in the above-referenced text edited by Marshall (see Section 5.7.3) do not utilize the polarization sensitive beam splitting characteristics of their deflectors. They are not suitable for internal drum imaging systems. Centered facet deflectors have the deflecting facet element centered on the deflector to rotation axis and have scan imaging properties that are totally rotationally symmetric when the central incident beam ray is collinear with the deflector rotation axis. In the above-reference Kramer patent application, there is described a non-disc dipole monograting deflector system using a through-borehole holder of a centered monofacet deflector, but which does not rely upon polarization sensitivity.

In addition to the foregoing features of the invention, it is a more specific object of the invention to provide centered monofacet deflector systems having a dipole laser beam scanning pattern which enables scan rate and scan duty cycle of the systems to be doubled and which is practical to manufacture and to maintain.

It is a further object of the invention to provide centered monofacet deflector systems which are suitable both for internal drum and flat field imaging applications.

It is a still further object of the invention to provide a centered monofacet deflector system which is operable at maximum deflector rotating speeds, for example, up to 20,000 rpm for ball bearing mounted deflectors and 40,000 to 50,000 rpm for air bearing mounted deflectors and which can produce scan rates from 300 to 1,200 scans per second.

Briefly described, a beam scanning system embodying the invention provides a pair of oppositely propagating scanning beams from an input beam (a dipole scanning pattern). The system uses a polarization sensitive beam deflection element which is rotatable upon an axis and has a surface intersecting the axis. The surface is oriented with respect to the axis for deflecting at said element and transmitting through said element first and second beam polarizations which are in orthogonal relationship. The system operates with an input beam which propagates along the axis and which can contain both of these opposite orthogonal polarizations (circular or random polarizations). The transmitted polarization is retroreflected back to the element with an orthogonal polarization and is deflected therefrom. Thus, dual beams of the same polarization (the polarization which the element deflects) are provided. These beams can be provided simultaneously or selectively by controlling the polarization of the input beam.

Due to the dipole sequential scanning property of the dipole deflector units provided by the invention, they can be utilized in systems having a recording scan angle of ≦180 degrees. Means may be provided for preventing light from the unused scanning beam from exposing the recording media.

The foregoing and other objects, features and advantages of the invention and presently preferred embodiments thereof will become more apparent from a reading of the following description in connection with the accompanying drawings in which.

Figure 1:
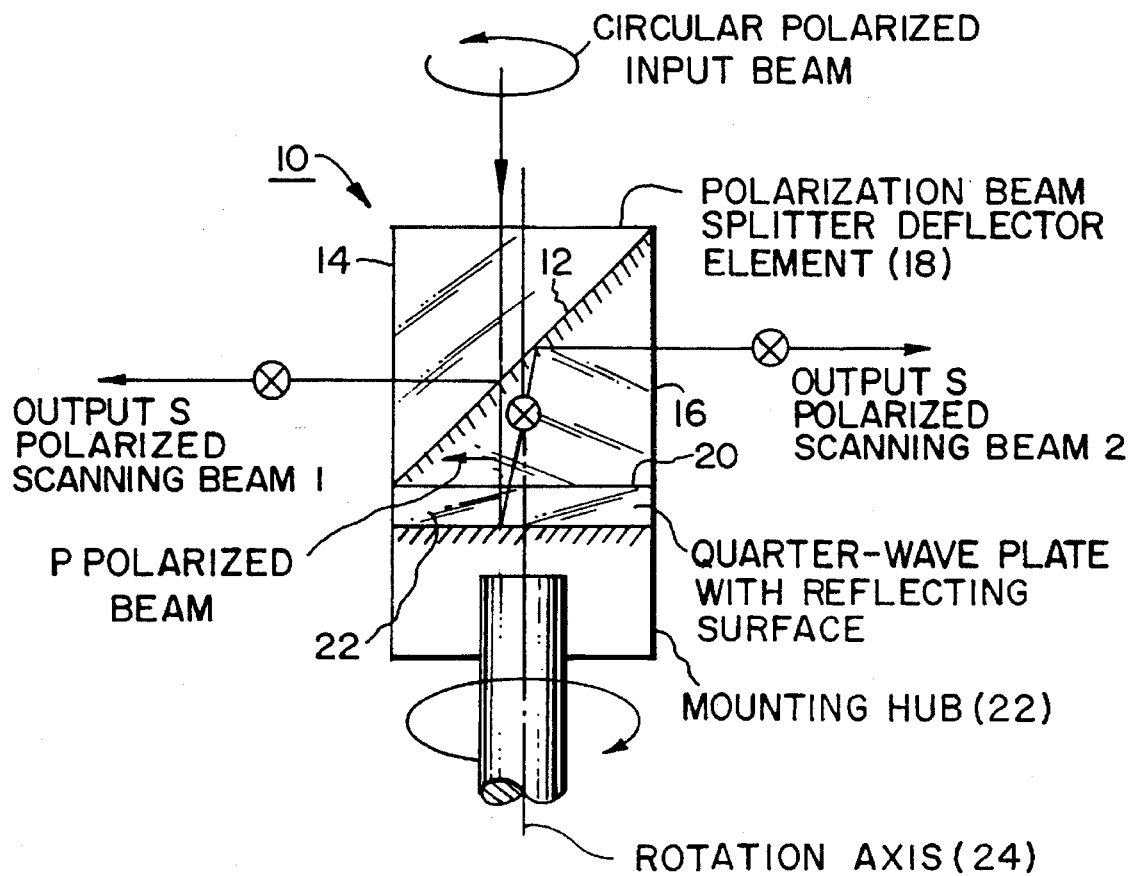
FIG. 1 is a schematic diagram of a deflector system in accordance with a first embodiment of the invention which produces simultaneous scanning beams.

Schematically illustrated in FIG. 1 is a DRC deflector system 10 that simultaneously generates two oppositely propagating scanning beams 1 and 2, each containing approximately half of the total incident beam power. The incident beam is randomly or, preferably, circularly polarized. The beam may be generated by a randomly polarized laser or a linearly polarized laser having a λ/4 (quarter wavelength) plate in its output beam. The DRC deflector system 10 eliminates the quarter-wave plate that served as the deflector entrance window in the deflector configuration shown in U.S. Pat. No. 5,223,956 of which this application is a continuation-in-part. With this quarter-wave plate removed, the incident circularly polarized beam propagates to the polarizing beam splitter deflecting surface 12 that is sandwiched between the two essentially identical 45 degree right angle prism elements 14 and 16 comprising the cube deflector element 18. This polarization beam splitter transmits virtually 100 percent of P polarized light while reflecting essentially 100 percent of S polarized light. P and S being the orthogonal polarizations contained in the circularly polarized input beam. The circularly polarized incident beam is split by the polarization beam splitter surface 12 into a reflected S polarized beam and a transmitted P polarized beam. Each of these linearly polarized beams contains approximately half of the incident beam power.

The reflected S polarized beam exits through the front surface of the cube deflector element as Scanning Beam 1 while the transmitted P polarized beam propagates to the quarter-wave plate 20 that is optically cemented to the deflector cube bottom surface. The quarter-wave plate 20 may alternatively be attached to the top surface of the mounting hub 22 with optical cement. This quarter-wave plate 20 has a high reflectance mirror coating 22 on its bottom surface and is orientated nearly perpendicular to the incident beam propagating direction and, therefore, the incident P polarized beam is retroreflected back in the direction of the incident beam source. The angle between the incident P polarized beam and the retroreflected beam in FIG. 1 has been exaggerated for illustrative purposes.

Having propagated twice through the quarter-wave plate, the retroreflected beam experiences a half-wave retardation and emerges from this wave plate orthogonally polarized with regard to the incident beam polarization direction, as depicted in FIG. 1. The S polarized retroreflected beam propagates back to the polarization beam splitter surface 12 where it is essentially totally reflected in a direction perpendicular to the deflector rotation axis 24 and emerges from the back surface of the deflector element as Scanning Beam 2. Beam intensity for both Scanning Beams 1 and 2 is constant as a function of deflector rotation angle for this deflector configuration as a result of using a circularly polarized incident beam and having the bottom wave plate rotate with the deflector assembly.

Figure 2:
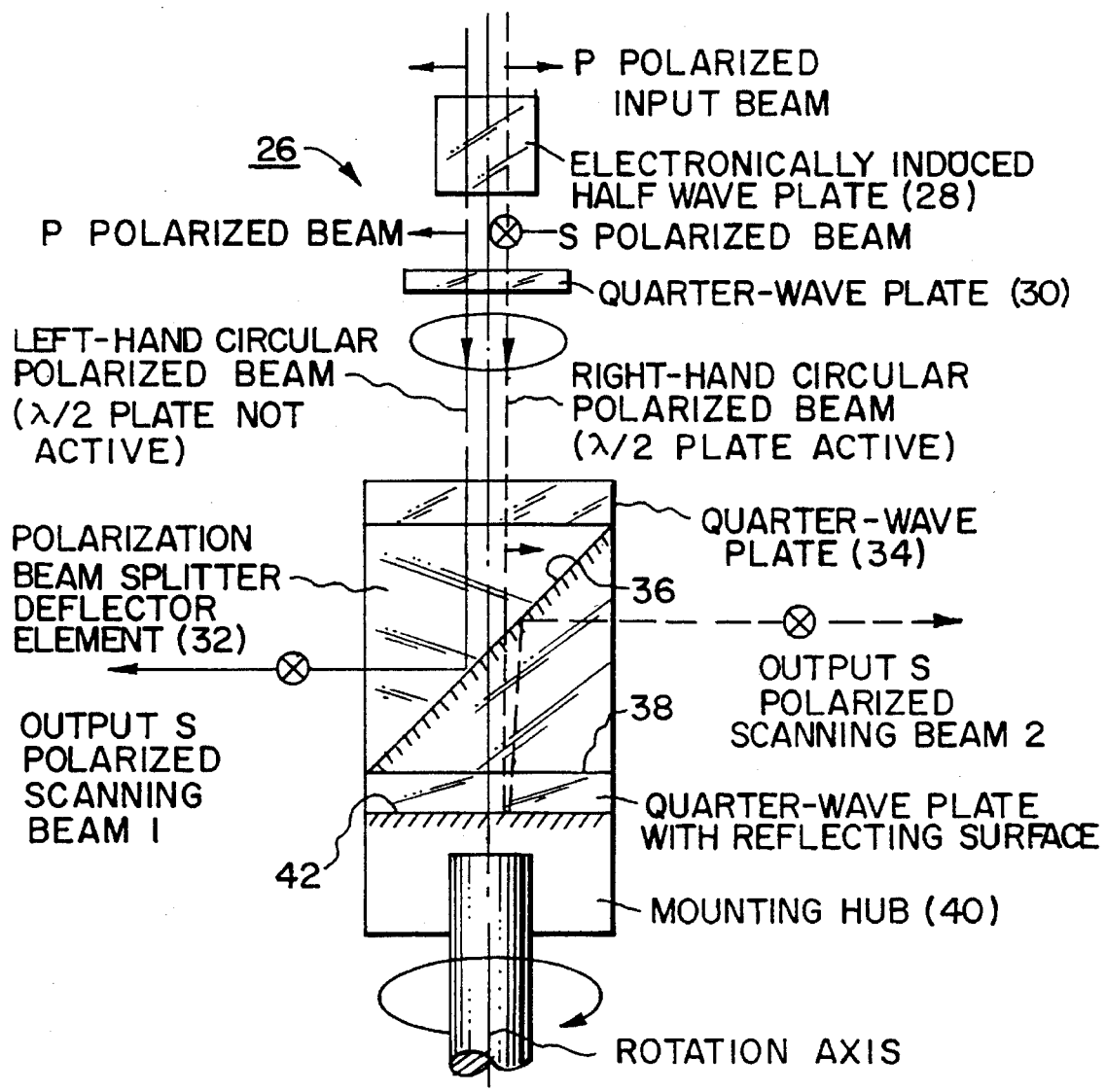
FIG. 2 is a schematic diagram of a deflector system in accordance with a second embodiment of the invention which can produce the dual scanning beams at different times.

Schematically illustrated in FIG. 2 is a DRC dipole deflector system 26 that sequentially generates oppositely propagating scanning beams that individually occur only during sequential half rotations of the deflector unit and contain approximately all of the power in the incident light beam to the deflector unit. The deflector system 26 includes an electrically induced half-wave plate 28 before a stationary quarter-wave plate 30 used to circularly polarize the incident beam to the deflector unit so that the beam can contain the orthogonal polarizations (P and S).

This electrically induced half-wave plate may operate in accordance with the Kerr electro-optic effect (and be a Kerr cell), the Cotton-Mouton effect, the linear electro-optic effect (and be a Pockels cell) or the Faraday effect. A Pockels cell or a Faraday effect device is presently preferred. Pockels cell light modulators can be designed to operate at gigahertz frequencies and, therefore, are preferred for ultra-high frequency applications. If a Pockels cell is used to fabricate the electrically induced half-wave plate, this Pockels cell could also be used to modulate the amplitude intensity of the scan beam. The Faraday effect may have sufficient switching speed to function as the electrically induced half-wave plate element 28 in the deflector system 26, when the switching rate is on the order of a millisecond.

A solid and a dashed incident beam ray are depicted in the FIG. 2 deflector system. These two beam rays illustrate how the deflector system sequentially generates oppositely propagating scan beams that contain approximately all the incident light beam power. These two beam rays are both P polarized before propagating through the electrically induced half-wave plate device. These beams may be generated by use of a linearly polarized laser. When the half-wave plate 28 is not activated (no field applied) the emerging beam is P polarized, as indicated by the solid incident beam ray in FIG. 2. This P polarized incident beam propagates through the stationary quarter-wave plate 30 which converts the P polarized incident beam into a left-hand circularly polarized incident beam. This P polarized solid incident beam ray could also have been converted to a right-hand circularly polarized beam, if the angular orientation of both the stationary quarter-wave plate and the quarter-wave plate serving as the deflector entrance window were rotated 90 degrees.

This left-hand circularly polarized solid beam ray is incident to the high efficiency DRC deflector element 32 and enters the deflector element via its top surface, which is a quarter-wave plate 34. This quarter-wave plate converts the incident left-hand circularly polarized beam into an S polarized beam with regard to the polarization sensitive beam splitter surface 36. This polarization beam splitter transmits essentially 100 percent of P polarized light while reflecting essentially 100 percent of S polarized light. Therefore, the S polarized solid beam ray is essentially totally reflected from this beam splitter surface 36 in a direction perpendicular to the deflector rotation axis and emerges from the deflector element 32 as Scanning Beam 1. Intensity of Scanning Beam 1 remains constant as a function of deflector rotation angle because the polarization state of the converted linearly polarized beam stays constant relative to the polarization beam splitter surface 36 as a result of using a circularly polarized incident beam and having the top quarter-wave plate 34 rotate with the deflector assembly.

When the half-wave plate 28 is activated (field applied), the beam emerging therefrom is S polarized, as indicated by the dashed incident beam ray in FIG. 2. This dashed S polarized incident beam ray propagates through the stationary quarter-wave plate 30 which converts the S polarized incident beam into a right-hand circularly polarized incident beam. This right-hand circularly polarized dashed beam ray is incident to the high efficiency DRC deflector element 32 and enters the deflector element via its top quarter-wave plate 34 surface. This quarter-wave plate 34 converts the incident right-hand circularly polarized beam into a P polarized beam with regard to the polarization sensitive beam splitter surface 36. Essentially all of the P polarized beam passes through the beam splitter surface and propagates to the quarter-wave plate 38 that is optically cemented to the deflector element bottom surface (or the quarter-wave plate 38 is attached to the top surface of the mounting hub 40). This second quarter-wave plate 38 has a high reflecting mirror coating 42 on its bottom surface and is orientated nearly perpendicular to the incident beam propagating direction and, therefore, the incident P polarized beam is retroreflected back in the direction of the incident beam source.

Having propagated twice through the second quarter-wave plate, the retroreflected dashed beam ray experiences a half-wave retardation and emerges from this wave-plate as an S polarized beam. This S polarized retroreflected beam propagates back to the polarization beam splitter surface where it is essentially totally reflected in a direction perpendicular to the deflector rotation axis and emerges from the deflector element as Scanning Beam 2. Intensity of Scanning Beam 2 is constant as a function of deflector rotation angle for this deflector configuration because the polarization state of the converted linearly polarized beams stay constant relative to the polarization beam splitter surface 36 as a result of using a circularly polarized incident beam and having both quarter-wave plates 34 and 38 of the deflector rotate with the deflector assembly.

With the deflector system 26, essentially all of the incident light beam power can be directed into either Scanning Beam 1 or 2, respectively, by not activating or by activating the half-wave plate 28. This dipole deflector system 26 can be used with scanning systems having a total scan angle of <180 degrees. Internal drum imaging systems using this dipole deflector system 2 may have a total image recording scan angle of approximately 170 degrees or less to avoid image exposure during the time period required to switch the beam power from one oppositely propagating scanning beam to the other scanning beam and/or to perform any system calibration or alignment functions. When a single Pockels cell is used as both the electrically induced half-wave plate and the system beam intensity modulator, the scan beam intensity is amplitude modulated by switching the Pockels cell between being activated and not being activated, which in turn switches incident beam power between Scanning Beams 1 and 2. Under these conditions, the scanning system should incorporate means for preventing light from the unused scanning beam from exposing the recording media, for example, an optical absorbing material member opposite to the recording media.

In both deflector systems 10 (FIG. 1) and 26 (FIG. 2) Scanning Beam 1 undergoes only a single reflection within the deflector element whereas Scanning Beam 2 undergoes two reflections within the deflector element. Therefore, the cross-scan angle of Scanning Beam 1 is sensitive to changes in deflector wobble angle, whereas the cross-scan angle of Scanning Beam 2 is not sensitive to changes in deflector wobble angle. Due to the sensitivity of Scanning Beam 1 to deflector wobble it is preferable that the DRC dipole deflector elements 18 and 32 be used with an air bearing motor spindle having essentially no change in its fixed wobble angle, when used for most high resolution imaging applications. The optical path length through the deflector elements 18 and 32 is longer for the Scanning Beam 2 ray than for the Scanning Beam 1 ray and, therefore, these deflectors are desirable in a preobjective deflector system (where the deflector system precedes the objective lens).

A potential problem with any multi-scanning deflector system is associated with aligning the scanning beams from each scanning facet so that they scan the same scan line trajectory (path). Any differences in scan line trajectory due to cross-scan beam error and/or in-scan beam error can degrade image quality. In-scan beam errors are associated with fixed scan positional beam timing errors between Scanning Beams 1 and 2 (deflector polar errors). For the deflector systems 18 and 32, this in-scan error can be corrected by use of a start-of-scan (SOS) detector that is triggered by the scanning laser beam. Pulses from this SOS detector fix the start-of-scan line position for each scan and thereby correct for any deflector polar errors. A similar in-scan correction technique can use a shaft encoder on the rotating deflector shift to generate a start-of-scan line pulse. For the shaft encoder case, the angular position for Scanning Beams 1 and 2 is calibrated relative to encode wheel pulse addresses. This calibration can be performed using a laser SOS detector arrangement.

A potential problem with the deflector systems 10 and 26 shown in FIGS. 1 and 2 is that the cross-scan angle for Scanning Beam 1 changes as the deflector wobble angle changes, whereas the cross-scan angle for Scanning Beam 2 is independent of the deflector wobble angle. Therefore, it is preferable that the fixed tilt (wobble) angle of the deflector elements 18 and 32 in the cross-scan direction be adjusted to ensure that Scanning Beams 1 and 2 follow the same scan line paths at the system image plane. This same scan line path condition is achieved when Scanning Beams 1 and 2 have the same cross-scan angle with regard to the deflector rotation axis. Off-set displacement in the axial ray position of Scanning Beam 1 relative to the axial ray position of Scanning Beam 2, does not contribute to the deflector cross-scan beam error for a preobjective deflector system since rays having the same cross-scan angle are focused by a scan lens after the deflector to the same cross-scan position at the lens image plane.

By using a precise alignment fixturing arrangement during fabrication of the deflector assemblies, the DRC deflector element can be angularly orientated with regard to the deflector mounting hubs 22 and 40 such that the same cross-scan angle is achieved for both scan beams. Once the correct alignment of the elements 18 and 32 is determined, with the fixturing arrangement, the elements may be attached to the mounting hub using a glue such as epoxy.

If it is determined that after the DRC deflector element is attached to the mounting hub that a cross-scan angular error exists between Scanning Beams 1 and 2, this angular error could be corrected by using a minideflector arrangement as described in part of Section 5.5.5, in Chapter 5 of the Marshall text, referenced above and entitled "Active Technique for Reducing Scan Beam Tracking Error." Cross-scan error is compensated for by this minideflector approach by measuring the periodic cross-scan errors between Scanning Beams 1 and 2 for the dipole deflector and using this error data to generate digital correction values that are stored in a ROM chip. These correction values are used to correct the cross-scan tracking error of the deflector by changing the incident cross-scan beam angle into the deflector by an amount that is equal to the error. This change in incident beam angle is accomplished by means of either an acousto-optic based minideflector or a piezo controlled mirror minideflector. This minideflector approach may be utilized to correct for the cross-scan beam tracking errors of dipole deflectors used in either flat-field imaging systems (see also Kramer, U.S. Pat. No. 5,179,463, January 1993) or in internal drum imaging systems (see also Kramer, U.S. Pat. No. 5,097,351, Mar. 1992). This minideflector approach may also be used to correct for random cross-scan tracking errors in these dipole deflector systems 10 and 26 by incorporating a dynamic cross-scan error measuring device just prior to the start-of-scan position and using the data from this cross-scan measuring device to update the minideflector correction system with regard to scan-to-scan changes in the cross-scan error pattern of the deflector system.

Schematically illustrated in FIGS. 3–6 are arrangements, that may be used in place of or in conjunction with the minideflectors discussed above, for correcting periodic cross-scan angular errors that exist in DRC dipole deflector systems, such as shown in FIGS. 1 and 2, after the deflector element 18 or 32 is attached to the mounting hub 22 or 40. These arrangements correct periodic cross-scan error in the dipole deflector by either allowing the deflector unit to be angularly realigned or by changing the angle and/or position of the deflected rays from the deflector unit. They also enable the angle of the scanning beams to be set and if desired can be used to make scanning beams 1 and 2.

Figure 3:
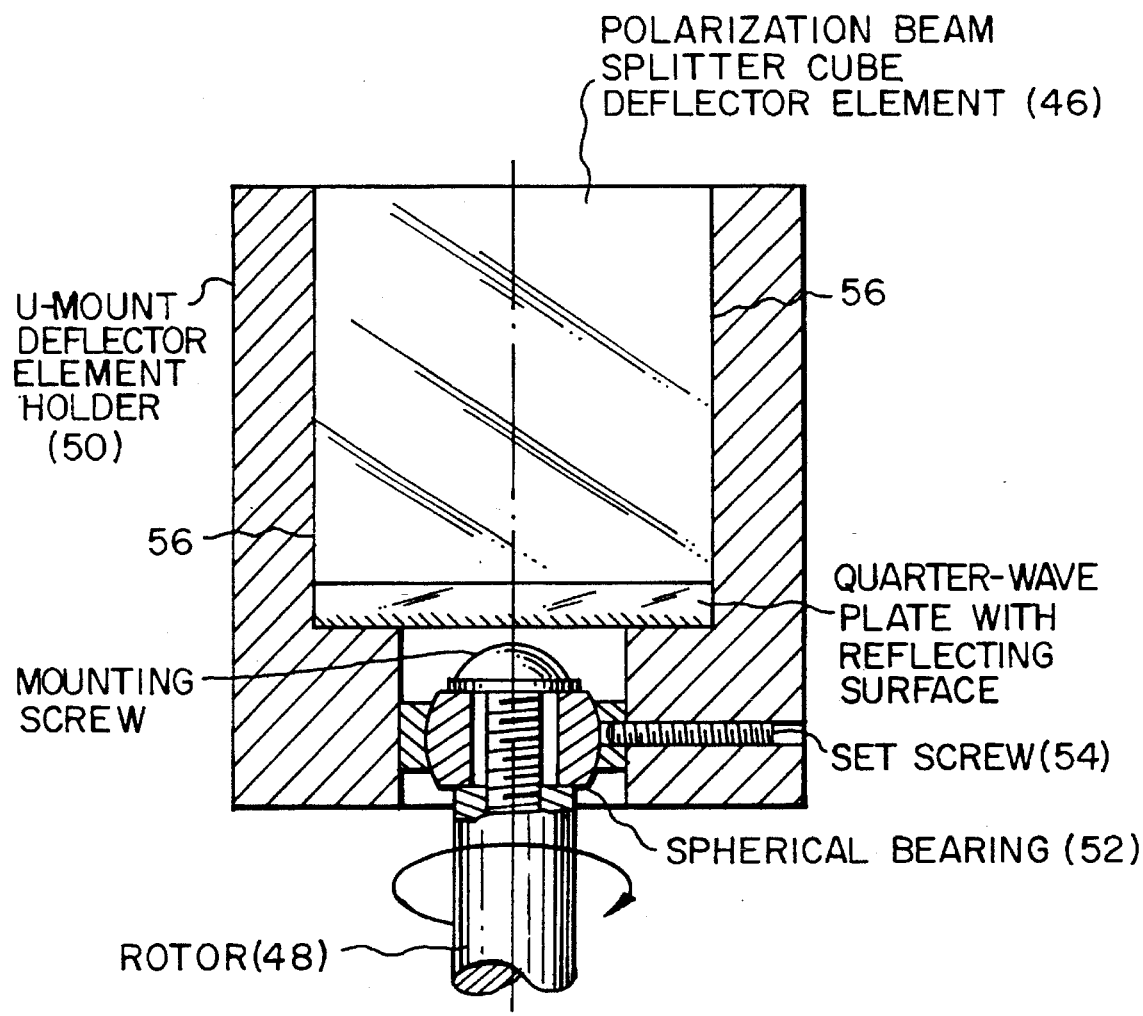
FIG. 3 is a sectional view illustrating the mounting of the deflector element.

In FIG. 3 the DRC dipole deflector element 46 (which is the same on design and operation as the elements 18 and 32) is attached to the deflector rotor shaft 48 by a U-shaped mount holder 50 that is part of the hub and incorporates a spherical bearing 52. The U-shaped mount 50 can be fabricated from a cylindrical rod having a radius equal to the diagonal dimension of the beam splitter cube deflector element 46. After cutting and finishing the ends of the cylindrical rod to the desired length, a slot is milled through the rod from its top surface to a depth and width large enough to accept the DRC deflecting element 46. The U-shaped mount holder 50 is also machined to accept the spherical bearing 52, a set screw 54 for locking spherical bearing movement, and also to accept balancing screws (not shown). The DRC deflector element 46 is slid into the slot machined for it and affixed to the mount by gluing. This gluing ms performed by filling the gap between the non-optical side surfaces 56 of the DRC deflector element and the side walls of the slot with an appropriate glue.

Figure 4:
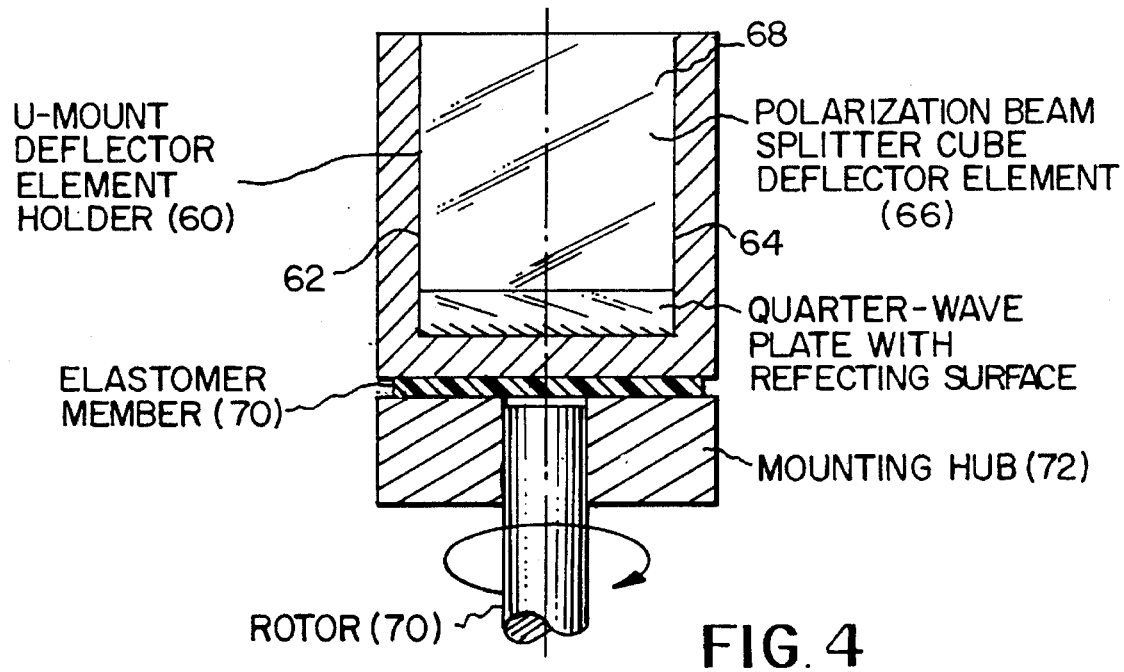
FIG. 4 is a sectional elevational view illustrating a mounting of the deflector element in accordance with the invention.
Figure 5:
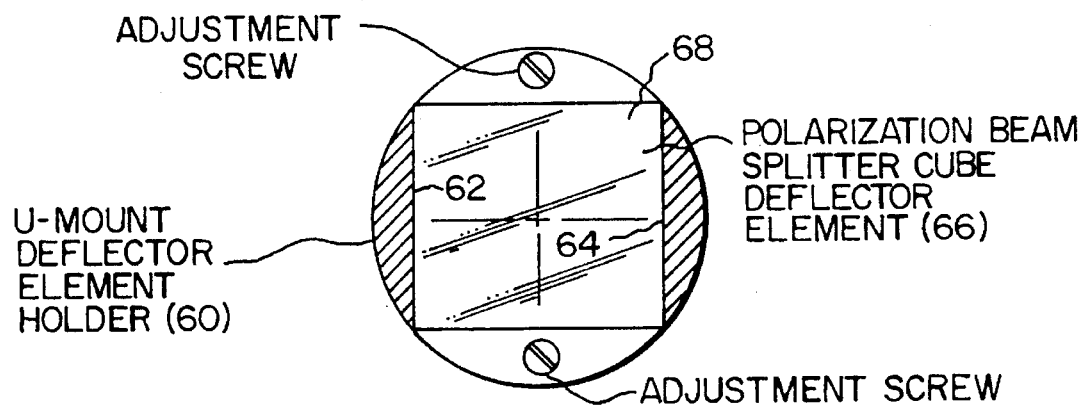
FIG. 5 is a plan view of the mounting shown in FIG. 4.

Referring to FIGS. 4 and 5, a U-shaped mount 60 similar to the mount 50 of FIG. 3 provides the non-optical side surfaces 62 and 64 of the DRC deflector element 66 with an improved aerodynamic shape without interfering with the optical properties of Scanning Beams 1 and 2 which exit through the front 68 and back (not shown) surfaces of the deflector element 66, respectively. In addition to the aerodynamic benefits provided by the U-shaped mount, this mount 60 enables the deflector element 66 to be securely attached to the motor rotor 70 via the hub 72 without the introduction of glue induced stresses into the optical surfaces of the deflector element 66.

The spherical bearing incorporated in the U-shaped mount embodiment in FIG. 3 enables the entire mount holder to be angularly orientated in any direction, thereby enabling the deflector element to be aligned so that the dipole deflector unit has no cross-scan beam tracking error. This spherical bearing mounting arrangement is similar to the spherical bearing mounting arrangements used to align a hologon disc perpendicular to the deflector rotation axis (see, Kramer, U.S. Pat. No. 5,183,350, February 1993). The angular alignment of the FIG. 3 deflector may be accomplished by initially aligning the deflector and mount with an alignment fixture so that Scanning Beams 1 and 2 have approximately the same cross-scan beam angle. The set screw 54 is then tightened so that the spherical bearing and, therefore, the mounting holder, are locked into this initial angular alignment position. The deflector unit is then rotated via its motor at a fixed rotation rate and the relative scan beam tracking position between Scanning Beams 1 and 2 is measured. This measured cross-scan beam tracking error data is used to readjust the angular orientation of the deflector. Subsequent adjustments of the deflector unit angular orientation are performed when the deflector unit is not rotating.

Angular adjustment of the DRC deflector element 66 in deflector unit shown in FIGS. 4 and 5 is achieved by means of a deformable elastomer member 70 similar to the elastomer mounting arrangements used to align a hologon disc deflector perpendicular to the deflector rotation axis (e.g., see, U.S. Pat. No. 5,183,350). The deformable elastomer member 70 and adjustment screws enable the cross-scan angle of the U-shaped deflector holder 60 with attached DRC deflector element 66 to be adjusted so that the dipole deflector unit has minimum cross-scan beam tracking error. This angular adjustment is achieved by tightening one adjustment screw while loosening the other adjustment screw, thereby pivoting the deflector element 66 in the cross-scan direction.

This pivoting motion may alternatively be achieved by replacing the elastomer member 70 by a cylindrical rod member that is orientated perpendicular to the output scanning beam direction from the DRC deflector element 66. This rod member is held at the center of the deflector unit by means of V-shaped grooves in both the U-mount holder 60 and mounting hub 72. Tightening one adjustment screw while loosening the other adjustment screw causes the deflector element to pivot about the rod member and thereby align the cross-scan angular orientation of the deflector element so the dipole deflector unit has minimum cross-scan beam tracking error. Alignment procedure for either the elastomer or rod pivoting deflector mounting unit is expected to be similar to that described for the spherical bearing deflector mounting unit of FIG. 3.

Figure 6:
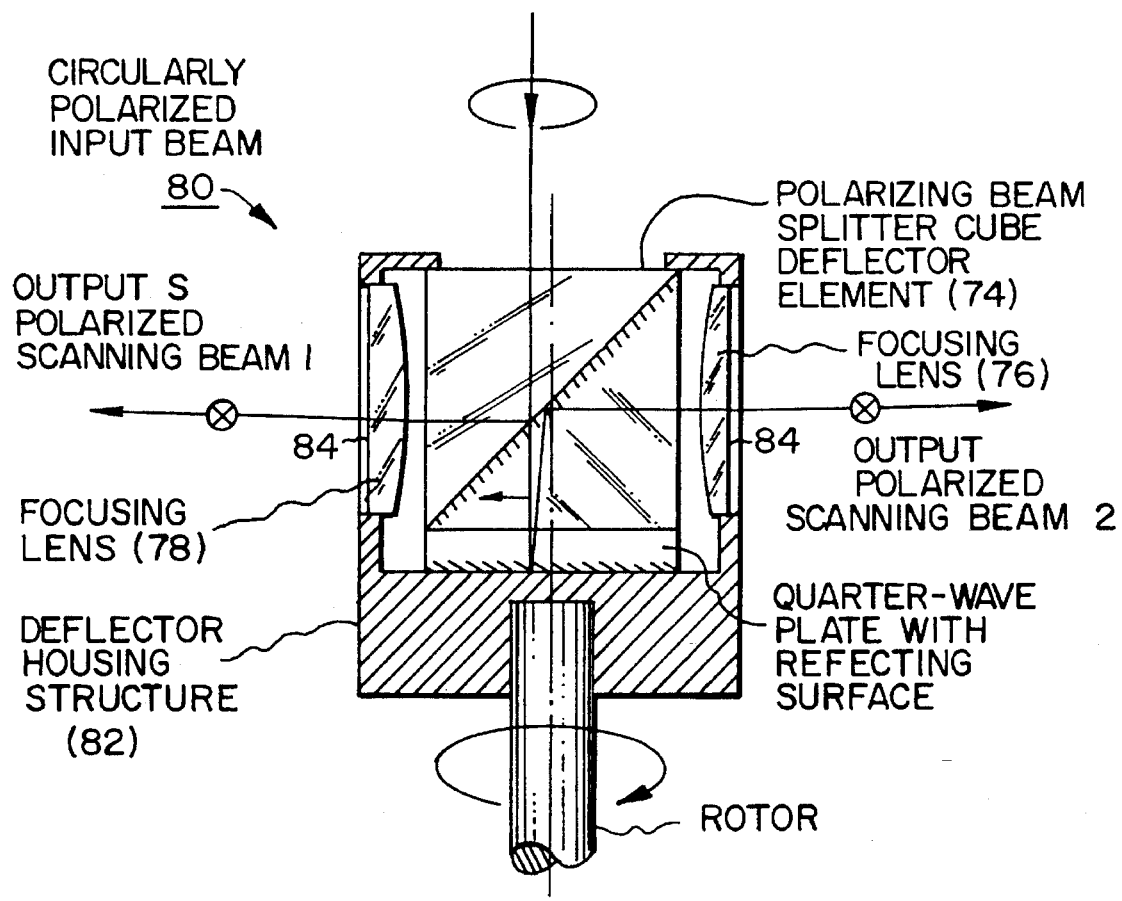
FIG. 6 is a sectional view illustrating an embodiment having lenses for controlling the direction of the dual scanning beams.

Referring to FIG. 6, on each side of the DRC dipole deflector element 74 are single element spherical lenses 76 and 78 that rotate with the deflector unit 80, thereby enabling the deflector unit 80 to generate high resolution images on the inside surface of a drum. The lens elements 76 and 78 may be screwed into the deflector housing (mount) structure 82, thereby enabling the axial distance between the lens and image plane to be adjusted for slight differences in lens focal lengths. While not shown in the FIG. 6 illustration, this deflector unit may have balancing screws to adjust the deflector unit rotational balance for radial mass differences associated with either differences in the mass and/or radial position of the lens elements 76 and 78.

Cross-scan beam tracking error for the deflector unit 80 can be corrected using minideflector (discussed above) and/or by use of either the spherical bearing mount in FIG. 3 or the elastomer mount in FIGS. 4 and 5. The cross-scan beam tracking error for the deflector unit 80 may also be corrected by using the lens elements 76 and 80 to change the angle and/or position of the deflected rays from the deflector unit. If the lens elements 76 and 78 are deliberately manufactured with a centration error relative to the axis of the threads used to screw the lenses into the deflector housing structure 82, then screwing the lenses into the housing structure will cause the lens axes to change their spatial position relative to the DRC deflector element. This change in lens axes position will cause the deflected rays from the DRC deflector element 74 to change their spatial location at the system image plane and, therefore, this lens centration technique could be used to correct for cross-scan beam tracking error within the dipole deflector unit.

If the lens elements 76 and 78 are deliberately manufactured so that their flat surfaces 84 have a wedge angle with respect to the convex lens surface axis, then the angle of the central ray passing through these lenses will be changed as a result of this wedge angle. The direction of the change in the central ray angle will rotate as these wedged lenses are screwed into the deflector housing structure and, therefore, this lens wedge angle could be used to correct for cross-scan beam tracking error within the dipole deflector unit. These lenses may deliberately contain both centration and wedge errors thereby allowing these lens elements to be used to change both the spatial position and angle of the scan beams emerging from the deflector.

The wedge angle technique can also be used to correct for the cross-scan beam error in DRC dipole deflectors used for flat-field imaging systems. For the flat-field imaging case, the lens elements 76 and 78 embodiment may be replaced by flat window elements incorporating a deliberate wedge angle. Rotation of these flat wedged window elements causes a change in the scanning beam angle and, thereby, enables these wedged window elements to be used to correct for cross-scan beam tracking error within the dipole deflector unit 80.

It is important to note that the cross-scan beam error for a DRC dipole deflector unit cannot be corrected by utilizing a flat wedged entrance window that rotates with the deflector unit because any fixed change in incident beam angle to the DRC deflector element causes both Scanning Beams 1 and 2 to be deviated in the same angular direction. Cross-scan beam error for the dipole deflector configuration can only be corrected by techniques that cause one of the scanning beams to change its angular orientation relative to that of the other scanning beam. Because fixed changes in the incident beam angle do not change the relative angular orientation of the scanning beams from a DRC dipole deflector unit, slow changes in the incident angle due to system alignment changes have minimum effect on cross-scan beam errors.

Figure 7:
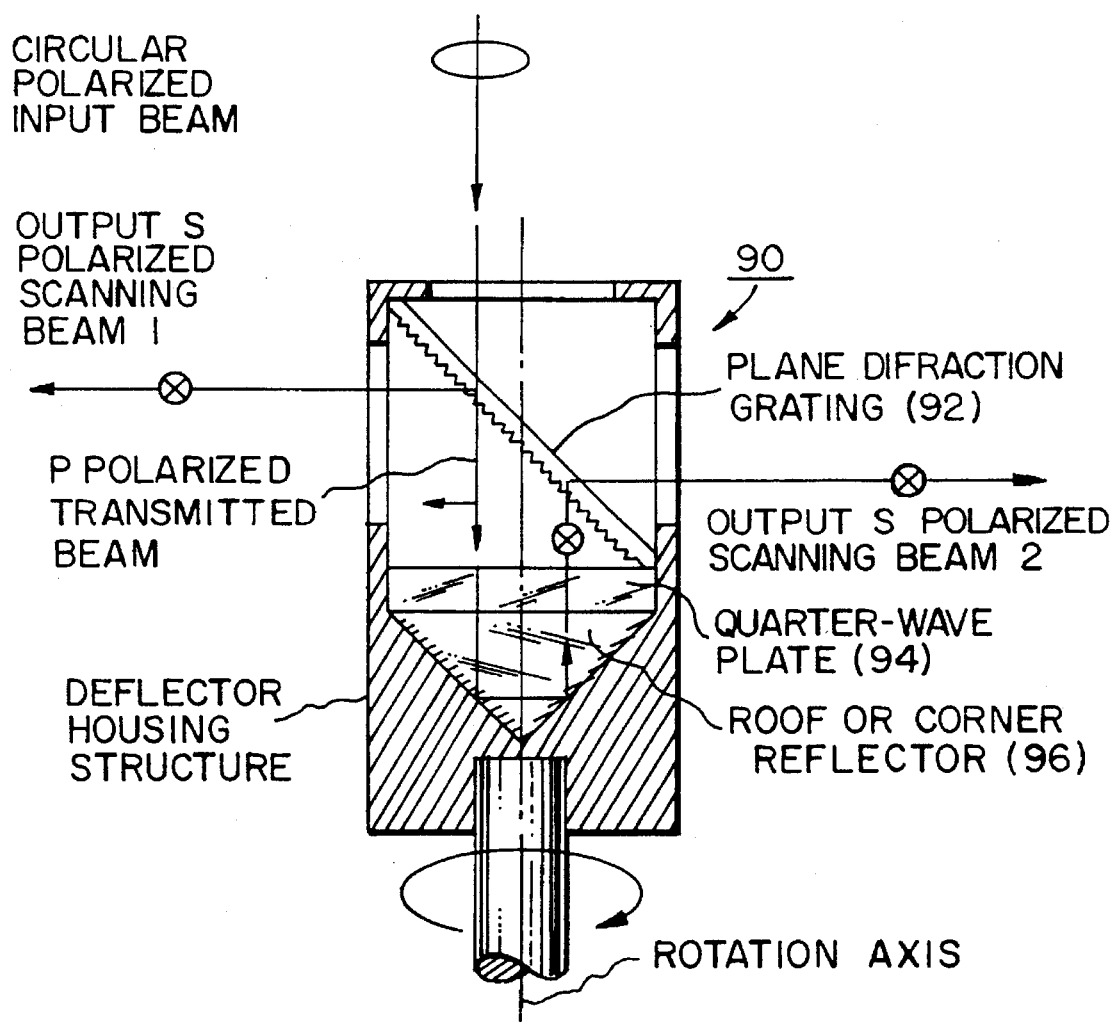
FIG. 7 is a schematic, sectional view illustrating a further embodiment of the invention using an NPDG element.

Schematically illustrated in FIG. 7 is a NPDG deflector system 90 that has been configured to simultaneously generate two oppositely propagating scan beams, each containing approximately half of the incident light beam power from the NPDG deflector element 92 which operates as a polarization sensitive beam splitting deflector element. A quarter-wave plate 94, a roof or corner type retro-reflector 96 and an incident beam which is circularly polarized are used. The incident circularly polarized beam propagates to the plane diffraction grating deflector element 92 which is arranged at 45 degrees to the deflector rotation axis and has a $\lambda/D=1.4142$, where $\lambda$ is the wavelength of the input laser beam and D is the grating pitch. The radiometric diffraction efficiency data (see FIG. 5.23 in the Marshall text) shows that the circularly polarized incident beam is split by the diffraction grating deflector element 92 into a diffracted S polarized beam and a transmitted P polarized beam. Each of these linearly polarized beams contains approximately half of the incident beam power.

The diffracted S polarized beam exits through the front surface of the deflector unit as Scanning Beam 1 while the transmitted P polarized beam propagates to the quarter-wave plate 94 positioned below the grating deflector element. Optically cemented to the quarter-wave plate is either a roof or corner reflector element 96 arranged so that the incident P polarized beam is retroreflected back in the direction of the incident beam source. When a roof reflector is used, it is orientated so that the apex roof axis is perpendicular to Scanning Beam 1, as depicted in FIG. 7. For this roof reflector orientation, tile retroreflected beam remains parallel in the cross-scan direction to the incident P polarized beam direction even when the deflector unit wobble angle changes. When a corner deflector is utilized, the retroreflected beam remains parallel in all directions to the incident P polarized beam direction even when the deflector unit wobble angles changes.

Having propagated twice through the quarter-wave plate, the retroreflected beam experiences a half-wave retardation and emerges from this wave plate orthogonally polarized with regard to the incident beam polarization direction, as depicted in FIG. 7. The S polarized retroreflected beam propagates back to the grating deflector surface where it is essentially totally diffracted in a direction perpendicular to the deflector rotation axis and emerges from the back surface of the deflector element as Scanning Beam 2. Beam intensity for both Scanning Beams 1 and 2 is constant as a function of deflector rotation angle for this deflector configuration, as a result of using a circularly polarized incident beam and having the bottom wave plate rotate with the deflector assembly.

Figure 8:
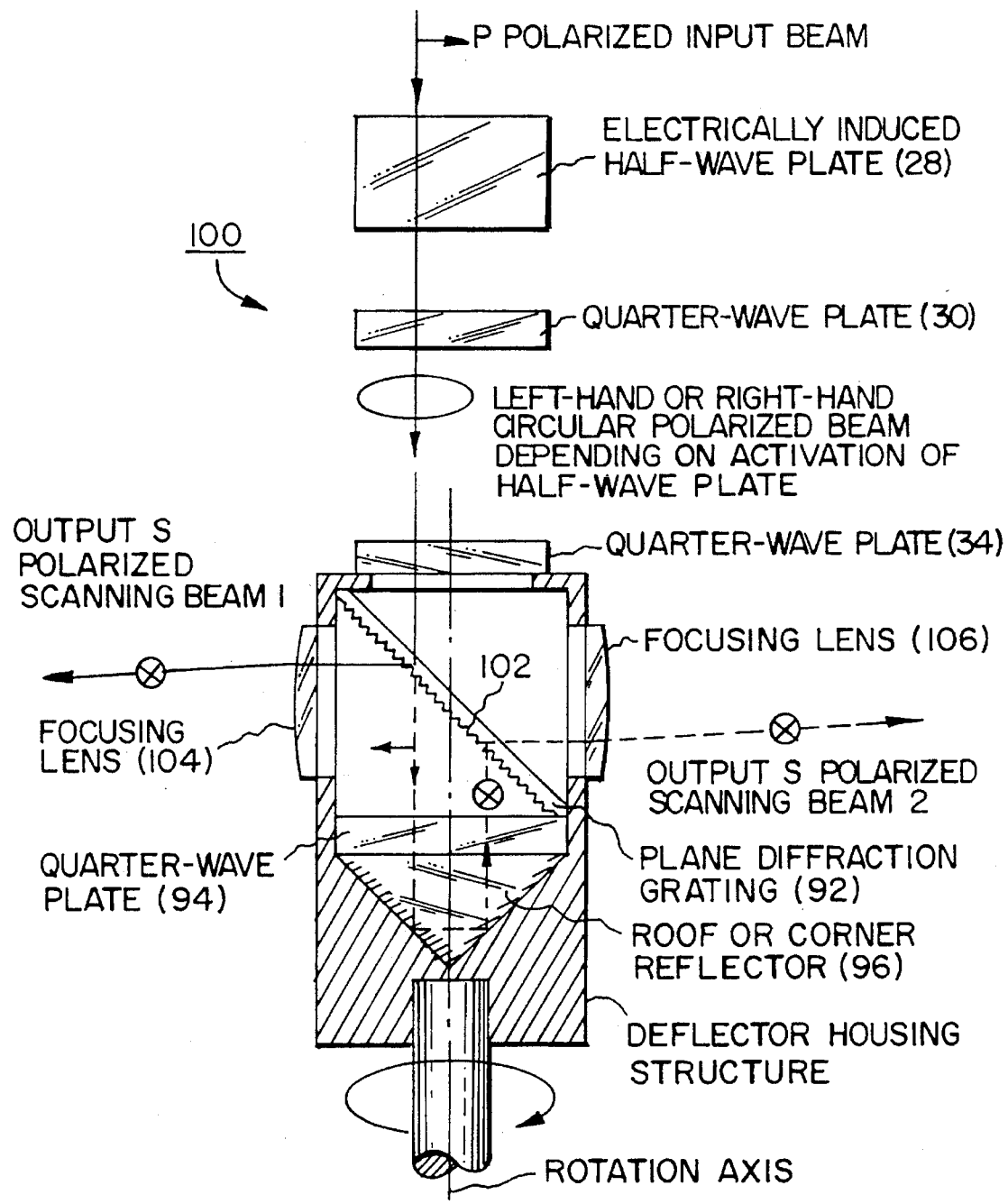
FIG. 8 is a schematic diagram illustrating a still further embodiment of the invention for generating dual scanning beams at different times and which utilizes an NPDG element.

Schematically illustrated in FIG. 8 is a NPDG dipole deflector system 100 that sequentially generates oppositely propagating scan beams that individually occur only during sequential half rotations of the deflector unit and contain approximately all of the power in the incident light beam to the deflector unit. The NPDG deflector system 100 includes an electrically induced half-wave plate 28 before the stationary quarter-wave plate 30 used to circularly polarized the incident beam to the deflector unit and by having a quarter-wave plate 34 serve as the deflector entrance window, similar to the deflector system 26 shown in FIG. 2.

As in FIG. 2, the input beam is P polarized before propagating through the electrically induced half-wave plate 28. When the half-wave plate 28 is not activated (no field applied), the emerging beam is P polarized. This P polarized incident beam propagates through the stationary quarter-wave plate 30 which converts the P polarized incident beam into a left-hand circularly polarized incident beam. This P polarized beam could also have been converted to a right-hand circularly polarized beam, if the angular orientation of both the stationary quarter-wave plate and the quarter-wave plate serving as the deflector entrance window were rotated by 90 degrees.

The left-hand circularly polarized beam is incident to the high efficiency NPDG deflector element 94 and enters the deflector element via its top surface, which is the quarter-wave plate 34. This quarter-wave plate 34 converts the incident left-hand circularly polarized beam into an S polarized beam with regard to the plane diffraction grating deflector surface 102. This grating deflector surface transmits virtually 100 percent of P polarized light while diffracting essentially 100 percent of S polarized light, since the grating surface is at 45 degrees to the incident beam and has a $\lambda/D=1.4142$. Therefore, the S polarized beam is essentially totally diffracted at grating surface 102 in a direction perpendicular to the deflector rotation axis and emerges from the deflector element as Scanning Beam 1. Intensity of Scanning Beam 1 remains constant as a function of deflector rotation angle for this deflector configuration because the polarization state of the converted linearly polarized beam stays constant relative to the grating deflector surface as a result of using a circularly polarized incident beam and having the top quarter-wave plate 34 of the deflector rotate with the deflector assembly.

When the half-wave plate 28 is activated (field applied) the emerging beam is S polarized. This S polarized incident beam propagates through the stationary quarter-wave plate 30 which converts the S polarized incident beam into a right-hand circularly polarized incident beam. This right-hand circularly polarized beam is incident to the high efficiency NPDG deflector element 92 and enters the deflector element via its top quarter-wave plate 34 surface. This quarter-wave plate 34 converts the incident right-hand circularly polarized beam into a P polarized beam with regard to the grating deflector surface 102. Essentially all of the P polarized beam is transmitted through the grating deflector surface 102 and propagates to the quarter-wave plate positioned below the grating deflector element. Optically cemented to the quarter-wave plate 94 is either a roof or corner reflector element 96 arranged so that the incident P polarized beam is retroreflected back in the direction of the incident beam source. The reflector element is orientated so that the retroreflected beam remains parallel in the cross-scan direction to the incident beam direction even if the deflector unit wobble angle changes.

Having propagated twice through the second quarter-wave plate 94, the retroreflected beam experiences a half-wave retardation and emerges from this wave-plate 94 as an S polarized beam. This S polarized retroreflected beam propagates back to the grating deflector surface 102 where it is essentially totally diffracted in a direction perpendicular to the deflector rotation axis and emerges from the deflector element as Scanning Beam 2. Intensity of Scanning Beam 2 is constant as a function of deflector rotation angle for this deflector configuration because the polarization state of the converted linearly polarized beams stay constant relative to the grating deflector surface as a result of using a circularly polarized incident beam and having both quarter-wave plates of the deflector rotate with the deflector assembly.

Essentially all of the incident light beam power can be directed into either Scanning Beam 1 or 2, respectively, by hoe activating or by activating the half-wave plate 28. This dipole deflector embodiment can only function as designed when used with scanning systems having a total scan angle of <180 degrees. It is expected that internal drum imaging systems using this dipole deflector would have a total image recording scan angle of approximately 170 degrees or less to avoid image exposure during the time period required to switch the beam power from one oppositely propagating scanning beam to the other scanning beam and/or to perform any systems calibration or alignment functions as may be required. When a single Pockels cell is used as both the electrically induced half-wave plate and the system beam intensity modulator, the scan beam intensity is amplitude modulated by switching the Pockels cell between being activated and not being activated, which in turn switches incident beam power between Scanning Beams 1 and 2. Under these conditions, the scanning system should incorporate means (e.g., an absorber opposite to the image recording media) for preventing light from the unused scanning beam from exposing the recording media.

For these NPDG dipole deflector systems 90 and 100, both Scanning Beams 1 and 2 have cross-scan beam tracking angles that are essentially insensitive with regard to changes in deflector wobble angle. This insensitivity occurs because both scan beams operate at the minimum deviation condition for every deflector rotation angle by having $\theta_i=\theta_d$ (angle of incidence=angle of diffraction) and by having the incidence beam be parallel with regard to the deflector rotation axes. The parallel incidence beam condition for Scanning Beam 2 is achieved by using a roof or corner type retroreflecting element which keeps the retroreflected beam parallel in the cross-scan direction to the incident beam even when the deflector unit wobble angle changes. It is therefore evident that cross-scan beam tracking errors that might exist between Scanning Beams 1 and 2 cannot be corrected using either the spherical bearing or pivoting deflector mounting arrangements illustrated in FIGS. 3–5. Either ball bearing or air bearing spinner motors are preferably used to minimize cross-scan beam tracking error for deflectors 90 and 100.

Cross-scan beam tracking error can occur in these NPDG dipole deflector systems 90 and 100 when the $\lambda/D$ ratio for the grating element is not equal to 1.4142, the grating element has a $\lambda/D=1.4142$ but the element is significantly misaligned from being at 45 degrees to the deflector rotation axis, the retroreflected beam from the quarter-wave plate/retroreflector assembly is not exactly parallel to the incident beam direction as a result of manufacturing errors in this assembly, and/or the incident beam to the deflector unit is not parallel to the deflector rotation axis. Changes in the incident beam angle to the NPDG dipole deflector units 90 and 100 may cause cross-scan beam tracking error between Scanning Beams 1 and 2 and, therefore, angular changes in the incident beam due to system alignment changes are desirably minimized. The expected sources of cross-scan beam tracking error for these NPDG dipole deflector embodiments are essentially fixed with time and, therefore, can be readily corrected for using a number of techniques.

The cross-scan beam tracking properties of the NPDG dipole deflector systems 90 and 100 can be altered when the quarter-wave plate/retroreflector assembly 94, 96 are replaced by a quarter-wave plate having a high reflecting mirror coating on its bottom surface, similar to the arrangement illustrated for the DRC deflectors of FIGS. 1 and 2. While a quarter-wave plate with bottom reflecting surface is mechanically simpler than the retroreflector arrangements illustrated in the deflector units of FIGS. 1 and 2, this single retroreflecting surface arrangement makes the cross-scan beam tracking error performance of the NPDG dipole deflector units sensitive to changes in deflector wobble angle, since any change in the retroreflected beam angle translates directly to a corresponding change in the angle of Scanning Beam 2. If a single retroreflecting surface arrangement is used for the NPDG dipole deflectors, these deflectors are desirably driven with an air bearing motor spindle having essentially no change in its fixed wobble angle when used for most high resolution imaging applications. Cross-scan beam tracking error that occurs in NPDG dipole deflectors utilizing a single surface retroreflecting arrangement can be corrected using the same techniques that are described above for correcting cross-scan beam error in DRC dipole deflectors.

In-scan beam errors associated with fixed scan positional beam timing errors between Scanning Beams 1 and 2 (deflector polar errors) for the NPDG dipole deflector systems 90 and 100 can, as was the case for the DRC dipole deflector geometry shown in FIGS. 1 and 2, be corrected by use of either a start-of-scan detector that is scan beam triggered or by means of a shaft encoder on the deflector unit. As was also the case for the DRC dipole deflector geometry, the optical path length through the NPDG dipole deflector element is significantly longer for the Scanning Beam 2 ray than for the Scanning Beam 1 ray and, therefore, these deflectors can be utilized in a preobjective deflector system but not in a postobjective deflector system.

As previously noted, the cross-scan beam tracking error for the NPDG dipole deflector system illustrated in FIGS. 7 and 8 are essentially insensitive to deflector wobble angle change and, therefore, angular realignment of the deflector unit cannot be used to correct for cross-scan beam tracking error between Scanning Beams 1 and 2. This cross-scan beam error can be corrected using the same type of minideflector arrangement that was described for use with the DRC dipole deflector units 10 and 26 (FIGS. 1 and 2). Cross-scan beam tracking error for these NPDG dipole deflector systems 90 and 100 is essentially fixed with time and, therefore, is readily corrected by means of the minideflector approach or by static approaches, such as using specially designed lens elements or flat wedged window elements located in the output scan apertures of the deflector unit.

Using the same approach that was described for the DRC dipole deflector unit 80 (FIG. 6), single spherical focusing lens elements 104 and 106 located in the output scan apertures of the NPDG dipole deflector unit illustrated in FIG. 8 can be used to change the angle and/or position of the deflected rays from the unit and thereby correct cross-scan beam tracking errors between Scanning Beams 1 and 2. This change in angle and/or position of the deflected rays is accomplished by deliberately incorporating a centration and/or a wedge error into these focusing lenses. When the NPDG dipole deflector system 100 is used for flat-field imaging applications, the focusing lenses 104 and 106 in the NPDG can be replaced by flat window elements incorporating a deliberate wedge angle. Rotation of the flat wedged window elements about the axis of the output scan aperture causes a change in the deflected scanning beam angle that enables correction for the cross-scan beam tracking error within the dipole deflector unit.

Cross-scan beam tracking error can be corrected for the NPDG dipole deflector systems illustrated in FIGS. 7 and 8 by utilizing a flat wedged entrance window (not shown) that rotates with the deflector unit because any change in cross-scan incident beam angle to these deflector units causes Scanning Beams 1 and 2 to be angularly deviated in opposite cross-scan directions. This flat wedged entrance window may be screwed into the entrance aperture opening on the top surface of the FIG. 7 deflector embodiment. Rotation of the flat wedged window element about the axis of the entrance aperture causes the incident angles for the incident and retroreflected beams to change with respect to the grating deflector surface which directly translates into corresponding changes in the angular orientation of Scanning Beams 1 and 2. The flat wedged entrance window may be rotated to an angular position that would correct the cross-scan beam tracking error between Scanning Beams 1 and 2 and locked at that position. This wedged entrance window corrects the cross-scan beam error for all scan angles since the window rotates with the deflector unit thereby causing a fixed angular change of the incident and retroreflected beams with respect to the deflector surface of the grating 92.

This flat wedged entrance window approach can be utilized with the FIG. 8 deflector embodiment by having the window be positioned just prior to or just after the top quarter-wave plate 34, so that it can be rotated while maintaining the fixed angular orientation of the top quarter-wave plate 34 with respect to the grating deflector surface 102.

From the foregoing description, it will be apparent that improved, high efficiency deflector systems have been described. Variations and modifications in these systems, within the scope of the invention, will undoubtedly become apparent to those skilled in this art. Accordingly, the foregoing description should be taken as illustrative and not in a limiting sense.

We claim:

1. A beam scanning system for producing a pair of oppositely propagating scanning beams from an input beam which system comprises a polarization sensitive deflector element which is rotatable about an axis and has a surface intersecting said axis, and is oriented with respect to said axis for deflection at said element and transmission through said element respectively having first and second polarizations which are in orthogonal relationship of a beam propagating along said axis, means for providing said input beam propagating along said axis with a polarization containing both of said polarizations, and means for retroreflecting said second polarization which is transmitted through said element back to said element with said first polarization whereby one of said pair of beams is provided upon deflection of said first polarization at said element and the other of said pair of beams is provided upon deflection of said retroreflected second polarization at said element.

2. The system according to claim 1 wherein said polarization providing means for said input beam is operative to provide said beam with circular or random polarization.

3. The system according to claim 2 wherein said polarization providing means includes means for selectively providing said polarization as circular polarization in opposite senses.

4. The system according to claim 3 wherein said polarization providing means is operative to provide said opposite senses sequentially.

5. The system according to claim 3 further comprising means for changing the polarization of the input beam incident upon said element into said first polarization for said polarization in one of said opposite senses and into said second polarization for said polarization in the other of said opposite senses.

6. The system according to claim 3 wherein said means for selectively providing said polarizations in opposite senses comprises, disposed successively in the path of the input beam propagating along said axis, means for selectively retarding the propagation of the input beam by an odd integral of one-half wavelength of a wavelength contained therein, and means for retarding the propagation of said beam by an odd integral of one-quarter wavelength of said wavelength contained in said beam whereby to selectively provide said beam with said circular polarization in opposite senses.

7. The system according to claim 6 wherein said means for selectively retarding said propagation of said input beam is an electrically induced half wave plate.

8. The system according to claim 7 wherein said odd integral quarter wavelength retarding means is a quarter wave plate.

9. The system according to claim 1 wherein said element is a beam splitter having a polarization sensitive deflecting surface which respectively reflects and transmits said first and second polarizations.

10. The system according to claim 1 wherein said element is a nondisc plane diffraction grating (NPDG) deflector.

11. The system according to claim 1 wherein said element and said retroreflective means are contained in a dual reflecting cube (DRC) deflector system whereby to provide a DRC dipole deflector.

12. The system according to claim 1 wherein said input beam and said scanning beams are monochromatic radiation.

13. The system according to claim 1 wherein said monochromatic radiation is laser radiation.

14. The system according to claim 1 wherein said retroreflecting means includes a wave plate which provides odd integral quarter wavelength retardation of said beam which is transmitted through said element, said plate having opposite surfaces, one of which faces said element and the other of which faces a reflecting surface from which said transmitted beam is retroreflected through said plate and propagates to said element and is deflected as said second scanning beam.

15. The system according to claim 1 including means for directing the propagation of said pair of scanning beams.

16. The system according to claim 15 wherein said directing means makes said pair of beams collinear.

17. The system according to claim 1 wherein said retroreflecting means includes a corner or roof reflector having an apex along said axis, a wave plate which provides an odd integral quarter wavelength retardation, said plate and said reflector being disposed successively in the path of said transmitted beam to provide said retroreflected beam which is deflected at said element to provide said second scanning beam.

18. The system according to claim 17 wherein said element is a beam splitter having a polarization sensitive deflecting surface which respectively reflects and transmits said first and second polarizations.

19. The system according to claim 18 wherein said element is a nondisc plane diffraction grating (NPDG) deflector.

* * * * *